United States Patent
Evans et al.

(10) Patent No.: US 7,093,738 B1
(45) Date of Patent: Aug. 22, 2006

(54) DOSER FOR PORTABLE LIQUIDS AND FLUENT MATERIALS

(75) Inventors: Christopher T. Evans, Long Valley, NJ (US); Christopher Gieda, Long Valley, NJ (US)

(73) Assignee: Union Street Brand Packaging, LLC, Flanders, NJ (US)

( * ) Notice: Subject to any disclaimer, the term of this patent is extended or adjusted under 35 U.S.C. 154(b) by 172 days.

(21) Appl. No.: 10/918,460

(22) Filed: Aug. 16, 2004

Related U.S. Application Data

(60) Provisional application No. 60/494,795, filed on Aug. 14, 2003.

(51) Int. Cl.
*G01F 11/28* (2006.01)
*B65D 47/04* (2006.01)

(52) U.S. Cl. .............. 222/205; 222/453; 222/456; 222/476; 222/500

(58) Field of Classification Search .......... 222/205, 222/207, 453, 454, 456, 476, 477, 500
See application file for complete search history.

(56) References Cited

U.S. PATENT DOCUMENTS

| | | | | |
|---|---|---|---|---|
| 1,087,758 A | * | 2/1914 | Goodwin | 222/189.07 |
| 1,743,605 A | * | 1/1930 | Hollender | 222/196.2 |
| 2,581,897 A | * | 1/1952 | Allen | 222/81 |
| 3,146,923 A | * | 9/1964 | Chappell | 222/477 |
| 5,044,527 A | | 9/1991 | Hickerson | |
| 5,186,367 A | | 2/1993 | Hickerson | |
| 6,276,572 B1 | * | 8/2001 | Evans | 222/476 |
| 6,343,723 B1 | | 2/2002 | Hickerson | |

\* cited by examiner

*Primary Examiner*—Joseph A. Kaufman
(74) *Attorney, Agent, or Firm*—James Creighton Wray

(57) ABSTRACT

The present invention is a narrow neck dosage device for dispensing a predetermined quantity of product. An insert is installed in a narrow neck of a container with a bottom disk protruding into the body of the container and a top device within the neck of the container. The bottom disk initially hangs within the container body, while the top device rests on a divider that separates the neck from the container body. The top device can be upward angled blades, angled blades or a circular disc. A shaft connects the top devices and the bottom disk. The shaft also can have multiple configurations, such as spiral, flat helix, or random kinks. The shaft spins, rocks or oscillates and passes through a hole in the center of the divider. The divider has pre-sized holes that allow product to pass through. When the container is tipped into a dispensing position, fluid pressure moves the insert up the neck of the container until the bottom disk reaches the divider and seals the neck off from the body of the container. The container is returned to an upright position after dispensing and the weight of the insert spins, rocks or oscillates the insert downward into the starting position.

36 Claims, 3 Drawing Sheets

DOSER FOR PORTABLE LIQUIDS AND FLUENT MATERIALS

This application claims the benefit of U.S. Provisional Application No. 60/494,795, filed Aug. 14, 2003.

BACKGROUND OF THE INVENTION

Almost all households frequently use consumer household products, such as liquid detergents, soaps, fabric softeners and other cleaning products. Each consumer household product is packaged with some type of pouring system. Each year, millions of packages of these household products are sold around the world.

Most laundry detergents, fabric softeners and other similar products require users to measure out an appropriate dosage of product that depends on the size of a load and the amount of dirt to be removed. Human error in measuring is a common source of problems. Users often estimate the necessary dosage for a particular activity incorrectly. Underestimating results in insufficient cleaning, while overestimating results in a waste of expensive product.

The most common dosage device for these types of household products is a screw cap that fits over a spout on a bottle. Generally, the user measures an amount of product into the screw cap based on marks on the inside of the cap. This is a very inaccurate system, and often users will forgo measurements altogether and pour an estimated amount of product directly into the wash.

Other dosage devices have attempted to create a system for dispensing a recommended dosage of product. However, these systems do not create an efficient and reliable method for dispensing a predetermined amount of product. These systems can be expensive and are not easily adapted to existing packaging technology.

Needs exist for improved methods for inexpensive, efficient and easy dispensing of a predetermined amount of household product.

SUMMARY OF THE INVENTION

The present invention is a narrow neck dosage device for dispensing a predetermined quantity of product. An insert is installed in a narrow neck of a container with a bottom disk protruding into the body of the container and a top device within the neck of the container. The bottom disk initially hangs within the container body, while the top device rests on a divider that separates the neck from the container body. The top device can be rounded blades, angled blades or a circular disc. A shaft connects the top devices and the bottom disk. The shaft also can have multiple configurations, such as spiral, flat helix, or random kinks. The shaft passes through a hole in the center of the divider. The divider has pre-sized holes that allow product to pass through.

When the container is tipped into a dispensing position, fluid pressure forces the insert to move from its resting position inside the container up the neck of the container. Fluid pressure on the bottom disk causes the insert to spiral, rock or oscillate as it passes through the divider. Additional fluid pressure on the top device assists in this spiral, rocking or oscillating motion. The viscosity of the product and the type of top device are adjusted to ensure a specific predetermined amount of product is dispensed before the bottom disk reaches the divider and stops further flow from the container into the narrow neck. The insert is free to rotate or oscillate around the connection between the shaft and divider.

As the top device moves up the neck, product flows through the pre-sized holes in the divider. When the bottom disk reaches the divider, the product in the container body is sealed off from the product in the neck.

When dispensing is complete, the container is returned to an upright position. The weight of the bottom disk then forces the insert to rock, oscillate, or spin. This moves the bottom disk and shaft downward so that the dosage device is ready for the next dosage dispensing.

This system ensures that a consistent amount of product is dispensed each time the container is tilted for pouring. The insert is constructed so that the time needed for the bottom disk to travel from its resting position to its final position allows a predetermined amount of product to pass through the holes in the divider. The amount of product dispensed can be adjusted by altering the top device size, shaft length, top device configuration, or any combination thereof.

The present piston and spout system is compatible with existing container systems. Measurement errors, such as over or under dispensing, are eliminated by this quick and efficient system of dispensing product.

These and further and other objects and features of the invention are apparent in the disclosure, which includes the above and ongoing written specification, with the drawings.

DETAILED DESCRIPTION OF THE PREFERRED EMBODIMENTS

The present invention is a narrow neck dosage device for dispensing a predetermined quantity of product. An insert is installed in a narrow neck of a container with a bottom disk protruding into the body of the container and a top device within the neck of the container. The bottom disk initially hangs within the container body, while the top device rests on a divider that separates the neck from the container body. The top device can be upward sloped blades, angled blades or a circular disc. A shaft connects the top devices and the bottom disk. The shaft also can have multiple configurations, such as spiral, flat helix, or random kinks. The shaft passes through a hole in the center of the divider. The divider has pre-sized holes that allow product to pass.

Figure 1:
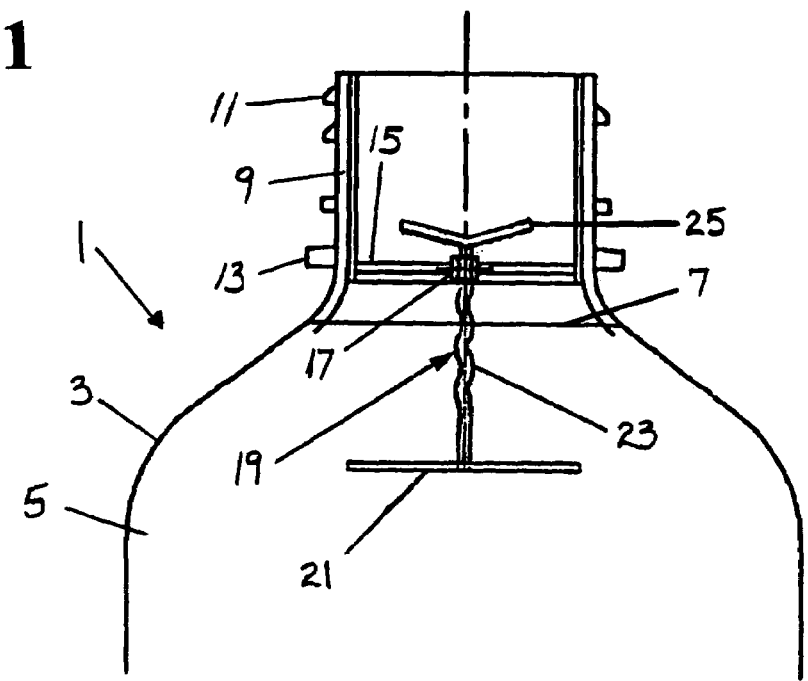
FIG. 1 is a side elevation of a narrow neck container with a spiral shaft and sloped blades in a resting position.

FIG. 1 shows a narrow neck container 1 with an insert system. The container has outer walls 3 that define the main body 5 of the container 1. Product 7 is held in the body 5 of the container 1. The narrow neck 9 of the container 1 has a cap device. Preferably, threads 11 and stops 13 are used to screw a cap onto the container 1, closing the container 1 when not in use.

A divider 15 spans the narrow neck 9 of the container 1. The divider 15 has a central hole 17 and other perforations that allow product 7 to pass.

An insert 19 fits between the narrow neck 9 and the container body 5. The insert 19 consists of a bottom disk 21, a shaft 23, and a top device 25. The bottom disk 21 is a generally flat, circular plate. In a resting position, the bottom disk 21 hangs within the container body 5.

The shaft 23 is connected to the bottom disk 21 in the center of the flat circular bottom disk 21 and extends upwards from the flat plane. The shaft 23 may have various configurations. In FIG. 1, the shaft 23 has a spiral configuration. The shaft 23 extends from the bottom disk 21, within the container body 5, through the hole 17 in the divider 15. The curved geometry of the shaft 23 is responsive to flow of the product 7 and aspiration of the container 1.

The upper end of the shaft 23 is connected to a top device 25. The top device may also have many configurations. In FIG. 1, the top device 25 has two rounded blades 27. The blades 27 are upward sloping. This assists in creating a rocking or oscillating motion that works the shaft 23 through the divider 15. In a resting position, the top device 25 rests on the divider 15, within the narrow neck 9 of the container 1.

Figure 2:
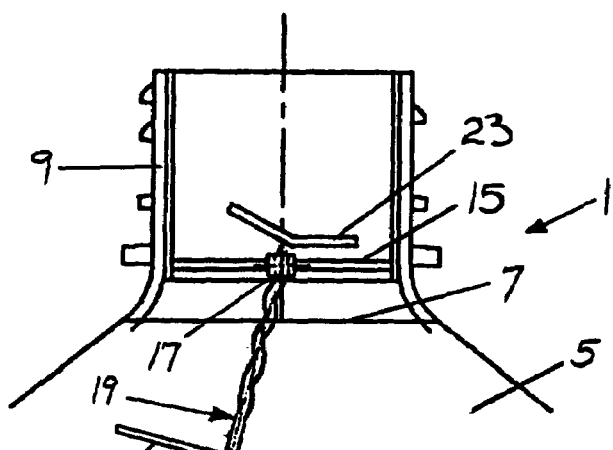
FIG. 2 is a detail of a narrow neck container showing oscillating or rocking movement of a shaft.

FIG. 2 shows the insert 19 rotating 29 within the container body 5. The insert 19 is free to rotate, spin, rock or oscillate 29 depending on the fluid level 7 in the container 1. This ensures proper fluid pressure on the insert 19 during pouring.

Figure 3:
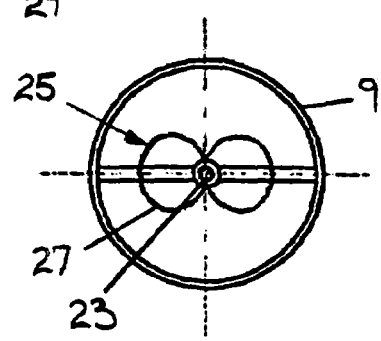
FIG. 3 is a top view of a rounded blade embodiment.

FIG. 3 shows a top view of the narrow neck 9 with a rounded blade 27 configurations. The rounded blades 27 facilitate a back and forth motion that moves the shaft 23, and thus the entire insert 19, stepwise through the hole 17 in the divider 15.

Figure 4:
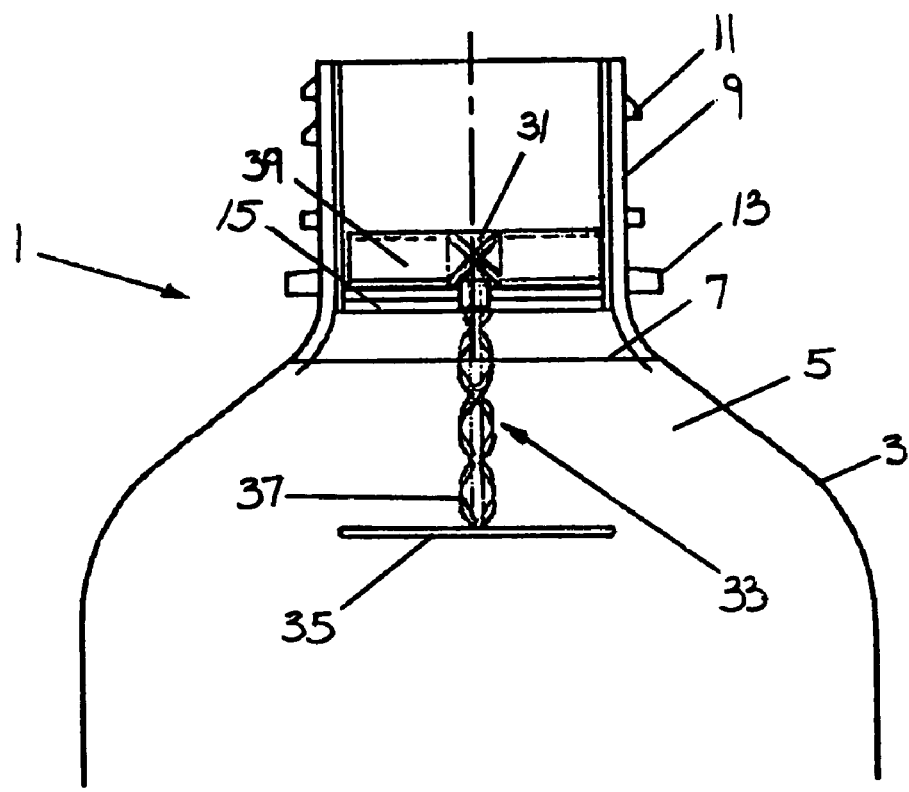
FIG. 4 is a side view of a narrow neck container with a flat helix shaft and angled, upward turning blades in a resting position.

FIG. 4 shows another embodiment of a narrow neck container 1 with an insert system. Again, the container 1 has outer walls 3 that define the main body 5 of the container 1. Product 7 is held in the body 5 of the container 1. The narrow neck 9 of the container 1 may have threads 11 and stops 13 used for screwing a cap onto the container 1 to close the container 1 when not in use.

A divider 15 spans the narrow neck 9 of the container 1. The divider 15 has a central hole 31 and other perforations that allow product 7 to pass.

An insert 33, similar to the previous embodiment, fits between the narrow neck 9 and the container body 5. The insert 33 consists of a bottom disk 35, a shaft 37, and a top device 39. The bottom disk 35 is a generally flat, circular plate. In a resting position, the bottom disk 35 hangs within the container body 5.

The shaft 37 is connected to the bottom disk 35 in the center of the flat circular bottom disk 35 and extends upwards from the flat plane. In FIG. 4, the shaft 23 has a flat helix configuration. The shaft 37 extends from the bottom disk 35, within the container body 5, through the hole 31 in the divider 15. The curved geometry of the shaft 37 is responsive to flow of the product 7 and aspiration of the container 1. The flat helix shape of the shaft 23 slides through the rectangular opening 31 in the divider 15. As pressure is applied to the bottom disc 35, the helix shape is forced through the hole 31.

The upper end of the shaft 37 is connected to a top device 39. In FIG. 4, the top device 39 has four angled blades 41. In a resting position, the top device 39 rests on the divider 15, within the narrow neck 9 of the container 1. The angled blades 41 assist the helix shaped shaft 37 move through the opening 31 by creating extra force away from the container body 5.

Figure 5:
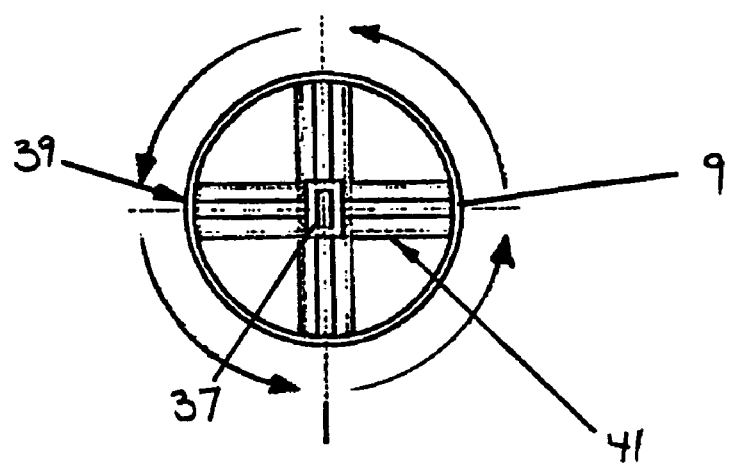
FIG. 5 is a top view of an angled blade embodiment.

FIG. 5 shows a top view of the narrow neck 9 with an angled blade 41 configuration. The angled blades 41 rotate in response to fluid pressure and flow. The angled blades 41 facilitate a rotational motion that moves the shaft 37, and thus the entire insert 33, through the hole 31 in the divider 15.

Figure 6:
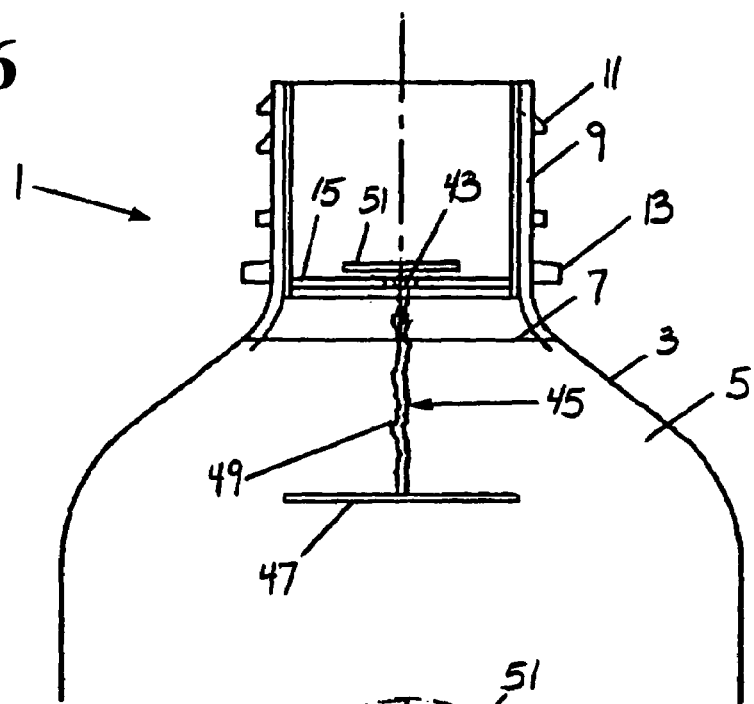
FIG. 6 is a side elevation of a narrow neck container with a random kink shaft and a circular top device in a resting position.

FIG. 6 shows a further embodiment of a narrow neck container 1 with an insert system. The container has outer walls 3 that define the main body 5 of the container 1. Product 7 is held in the body 5 of the container 1. The narrow neck 9 of the container 1 has threads 11 and stops 13 used for screwing a cap onto the container 1 to close the container 1 when not in use.

A divider 15 spans the narrow neck 9 of the container 1. The divider 15 has a central hole 43 and other perforations that allow product 7 to pass.

An insert 45 fits between the narrow neck 9 and the container body 5. The insert 45 consists of a bottom disk 47, a shaft 49, and a top device 51. The bottom disk 47 is a generally flat, circular plate. In a resting position, the bottom disk 47 hangs within the container body 5.

The shaft 49 is connected to the bottom disk 47 in the center of the flat circular bottom disk 47 and extends upwards from the flat plane. In FIG. 6, the shaft 49 has a random kink configuration. The shaft 49 extends from the bottom disk 47, within the container body 5, through the hole 43 in the divider 15. The random geometry of the shaft 49 is responsive to flow of the product 7 and aspiration of the container 1.

The upper end of the shaft 49 is connected to a top device 51. In FIG. 6, the top device 51 is a circular disc 53. In a resting position, the top device 51 rests on the divider 15, within the narrow neck 9 of the container 1.

Figure 7:
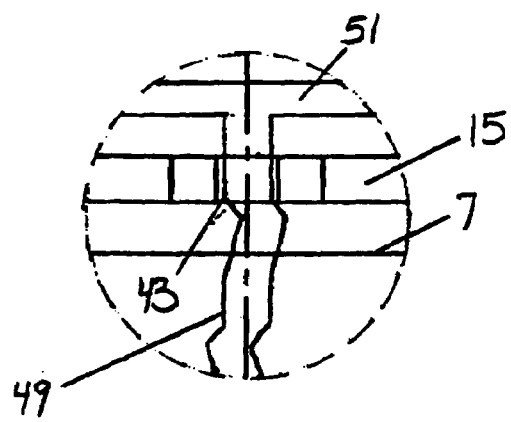
FIG. 7 is a detail of the connection between the shaft and the divider.

FIG. 7 shows a close up view of the hole 43 in the divider 15 with the shaft 49 passing through. The random kink design of the shaft 49 passes through the hole 43 at a controlled rate designed to allow the proper amount of product 7 to dispense. The insert 45 rocks or oscillates, thereby moving the insert 45 stepwise through the hole 43 in the divider.

Figure 8:
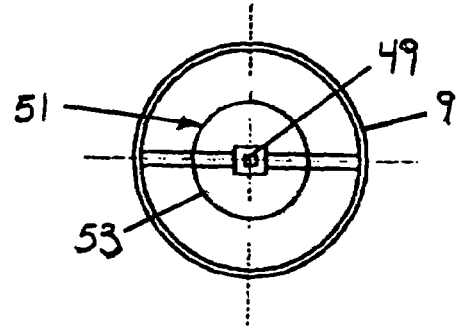
FIG. 8 is a top view of a circular top device embodiment.

FIG. 8 shows a top view of the narrow neck 9 with a circular disc 53 configuration. The circular disc 53 facilitates a back and forth motion that moves the shaft 49, and thus the entire insert 45, through the hole 43 in the divider 15.

When the container 1 is tipped into a dispensing position, fluid pressure forces the insert 45 to move from its resting position inside the container 1 up the neck 9 of the container 1. Fluid pressure on the bottom disk 47 causes the insert 45 to spiral, rock or oscillate as it passes through the divider 15. Additional fluid pressure on the top device 51, from product 7 flowing through the divider 15, assists in this spiral, rocking or oscillating motion. The viscosity of the product 7 and the type of top device 51 are adjusted to ensure a specific predetermined amount of product 7 is dispensed before the bottom disk 47 reaches the divider 15. The insert 45 is free to rotate around the connection between the shaft 49 and divider 15.

As the top device 51 moves up the neck 9, product 7 flows through the pre-sized holes in the divider 15. When the bottom disk 47 reaches the divider 15, the product 7 in the container body 5 is sealed off from the product 7 in the neck 9. The bottom disk 47 and the divider form a seal that prevents fluid movement.

When dispensing is complete, the container 1 is returned to an upright position. The weight of the bottom disk 47 then forces the insert 45 to rock, oscillate, or spin. This moves the bottom disk 47 and shaft 49 downward so that the dosage device is ready for the next dosage dispensing.

This system ensures that a consistent amount of product 7 is dispensed each time. The insert 45 is constructed so that the time needed for the bottom disk 47 to travel from its resting position to its final position allows a predetermined amount of product 7 to pass through the holes in the divider 15. The amount of product 7 dispensed can be adjusted by altering the top device 51 size, shaft 49 length, top device 51 configuration, or any combination thereof.

The present narrow neck dosage device is compatible with existing container 1 systems. Measurement errors, such as over or under dispensing, are eliminated by this quick and efficient system of dispensing product.

Repeating the dispensing process more than once can dispense larger doses. For example, if an extra large dose is needed, two dispensing motions may be used to dispense the correct amount of product 7. Alternatively, if an entire dose is not desired, the user can return the container 1 to an upright position before the product 7 trapped in the container 1 drains completely. The insert 45 then returns to its resting position within the container 1 and the unused product 7 flows back into the body of the container body 5.

While the invention has been described with reference to specific embodiments, modifications and variations of the invention may be constructed without departing from the scope of the invention.

The invention claimed is:

1. A doser apparatus comprising:
   a container with a body and a narrow neck,
   a cap for fitting over the narrow neck,
   liquid within the body of the container,
   a divider within the narrow neck for separating the body of the container and the narrow neck,
   perforations in the divider for passing liquid through the divider,
   an insert passing through a central opening in the divider comprising:
      a top device within the narrow neck,
      a shaft, and
      a bottom disk protruding into the body of the container.

2. The apparatus of claim 1, further comprising threads on the cap and complementary threads on the narrow neck for screwing the cap onto the narrow neck.

3. The apparatus of claim 1, wherein the liquid has a known density and viscosity.

4. The apparatus of claim 1, wherein the size and quantity of the perforations in the divider are determined by the desired flow rate of liquid out of the body of the container.

5. The apparatus of claim 1, wherein the top device is rounded blades.

6. The apparatus of claim 1, wherein the top device is angled blades.

7. The apparatus of claim 1, wherein the top device is a circular disc.

8. The apparatus of claim 1, wherein the shaft is spiral.

9. The apparatus of claim 1, wherein the shaft is a flat helix.

10. The apparatus of claim 1, wherein the shaft is randomly kinked.

11. The apparatus of claim 1, wherein the bottom disk is a circular disk.

12. The apparatus of claim 1, wherein tipping the container into a dispensing position causes the insert to rotate due to the fluid pressure on the side of the top device closest to the base of the container.

13. The apparatus of claim 1, wherein tipping the container into a dispensing position causes the insert to move from its resting position up the narrow neck due to fluid pressure on the side of the insert closest to the base of the container.

14. The apparatus of claim 13, wherein less than a full dose is administered by righting the container prior to the bottom disk forming a seal with the narrow neck by contacting the bottom disk and the divider.

15. The apparatus of claim 13, wherein the bottom disk forms a seal with the narrow neck when the bottom disk comes in contact with the divider.

16. The apparatus of claim 15, wherein a single dose is dispensed when the bottom disk forms a seal with the narrow neck.

17. The apparatus of claim 16, wherein righting the container causes the bottom disk to return to its resting position within the body of the container due to the weight of the bottom disk.

18. The apparatus of claim 17, wherein repeating the process dispenses additional doses.

19. The apparatus of claim 1, wherein the shaft spirals, rocks or oscillates through the central opening in the divider.

20. The apparatus of claim 1, wherein the type of product and type of insert regulates the flow of liquid.

21. The apparatus of claim 1, wherein the insert is compatible with existing container systems.

22. A dispensing apparatus comprising:
    a container with a body and a narrow neck,
    a cap for fitting over the narrow neck,
    liquid within the body of the container,
    a divider within the narrow neck for separating the body of the container and the narrow neck,
    perforations in the divider for passing liquid through the divider,
    an insert passing through a central opening in the divider comprising:
       an angled blade top device within the narrow neck,
       a spiral shaped shaft, and
       a bottom circular disk protruding into the body of the container.

23. A dispensing apparatus comprising:
    a container with a body and a narrow neck,
    a cap for fitting over the narrow neck,
    liquid within the body of the container,
    a divider within the narrow neck for separating the body of the container and the narrow neck,
    perforations in the divider for passing liquid through the divider,
    an insert passing through a rectangular central opening in the divider comprising:
       one or more angled blades within the narrow neck,
       a flat helix shaped shaft, and
       a bottom circular disk protruding into the body of the container.

24. A dispensing apparatus comprising:
    a container with a body and a narrow neck,
    a cap for fitting over the narrow neck,
    liquid within the body of the container,
    a divider within the narrow neck for separating the body of the container and the narrow neck,
    perforations in the divider for passing liquid through the divider,
    an insert passing through a rectangular central opening in the divider comprising:
       a round disc top device within the narrow neck,
       a randomly kinked shaft, and a bottom circular disk protruding into the body of the container.

25. A method of dispensing fluid from a narrow neck container comprising:
   providing a liquid filled container with a body and a narrow neck,
   unfastening a cap from over the narrow neck and removing the cap,
   tilting the container into a position for dispensing liquid from the body of the container,
   allowing fluid pressure to move an insert, wherein the insert comprises a top device, a shaft and a bottom disk, up the narrow neck of the container until the bottom disk contacts a perforated divider between the container body and the narrow neck and forms a seal,
   returning the container to an upright position,
   allowing the weight of the bottom disk to return the insert to its resting position,
   repeating the dispensing process if desired, and
   placing a cap over the narrow neck and fastening the cap onto the narrow neck.

26. The method of claim 25, wherein the top disk causes the insert to spin, facilitating movement of the shaft through the opening in the divider.

27. The method of claim 25, wherein the perforations in the divider, the shape and configuration of the insert and the density and viscosity of the liquid determine the flow rate of liquid out of the body of the container.

28. The method of claim 25, wherein the fastener on the cap is a screw system with threads on the cap and complementary threads on the narrow neck.

29. The method of claim 25, wherein the top device is rounded blades.

30. The method of claim 25, wherein the top device is angled blades.

31. The method of claim 25, wherein the top device is a circular disc.

32. The method of claim 25, wherein the shaft is spiral.

33. The method of claim 25, wherein the shaft is a flat helix.

34. The method of claim 25, wherein the shaft is randomly kinked.

35. The method of claim 25, wherein the bottom disk is a circular disk.

36. The method of claim 25, wherein the shaft spirals, rocks or oscillates through the central opening in the divider.

* * * * *